United States Patent [19]
Fischer

[11] Patent Number: 5,562,376
[45] Date of Patent: Oct. 8, 1996

[54] NAIL-LIKE FIXING ELEMENT WITH EXPANSION WEDGE

[75] Inventor: Artur Fischer, Waldachtal, Germany

[73] Assignee: fischerwerke, Arthur Fischer GmbH & Co KG, Waldachtal, Germany

[21] Appl. No.: 423,036

[22] Filed: Apr. 17, 1995

[30] Foreign Application Priority Data

| Apr. 21, 1994 | [DE] | Germany | 44 13 902.0 |
| Jun. 1, 1994 | [DE] | Germany | 44 19 148.0 |
| Sep. 23, 1994 | [DE] | Germany | 44 33 918.6 |

[51] Int. Cl.$^6$ .......................... F16B 13/04; F16B 15/00
[52] U.S. Cl. .................. 411/79; 411/80; 411/446; 411/903; 411/913
[58] Field of Search .................. 411/76, 78, 79, 411/80, 446, 922, 903, 913

[56] References Cited

U.S. PATENT DOCUMENTS

| 1,110,797 | 9/1914 | Knox | 411/76 |
| 1,121,076 | 12/1914 | Dillon . | |
| 1,396,398 | 11/1921 | Bowman . | |
| 2,560,525 | 7/1951 | Nyl | 411/76 |
| 2,774,273 | 12/1956 | Olson | 411/78 |
| 2,934,990 | 5/1960 | Johnson et al. . | |
| 3,021,745 | 2/1962 | Libon | 411/76 |
| 3,352,193 | 11/1967 | Lerich . | |
| 3,427,919 | 2/1969 | Lerich . | |
| 3,799,027 | 3/1974 | Galloway | 411/78 |

FOREIGN PATENT DOCUMENTS

| 2914739 | 10/1980 | Germany . | |
| 3345331 | 6/1985 | Germany . | |
| 3404306 | 8/1985 | Germany . | |
| 4305330 | 8/1994 | Germany . | |
| 809987 | 3/1959 | United Kingdom | 411/76 |
| 1190731 | 5/1970 | United Kingdom . | |

*Primary Examiner*—Neill R. Wilson
*Attorney, Agent, or Firm*—Michael J. Striker

[57] ABSTRACT

A nail-like fixing element has a shank having a rear end and a front end, and a retaining element provided at the rear end of the shank for clamping an article to a component. The shank has at least one expansion zone extending from the front end in a longitudinal direction of a part of a length of the shank and being formed by a free space. An expansion element is inserted in the free space. The space is formed as a U-shaped longitudinal slot with a base which slopes up toward the front end. The expansion element is formed as a wedge which is located in the longitudinal slot on the base so as to be displaceable towards the front end. The wedge has an outer face provided with teeth which project beyond the shank.

13 Claims, 3 Drawing Sheets

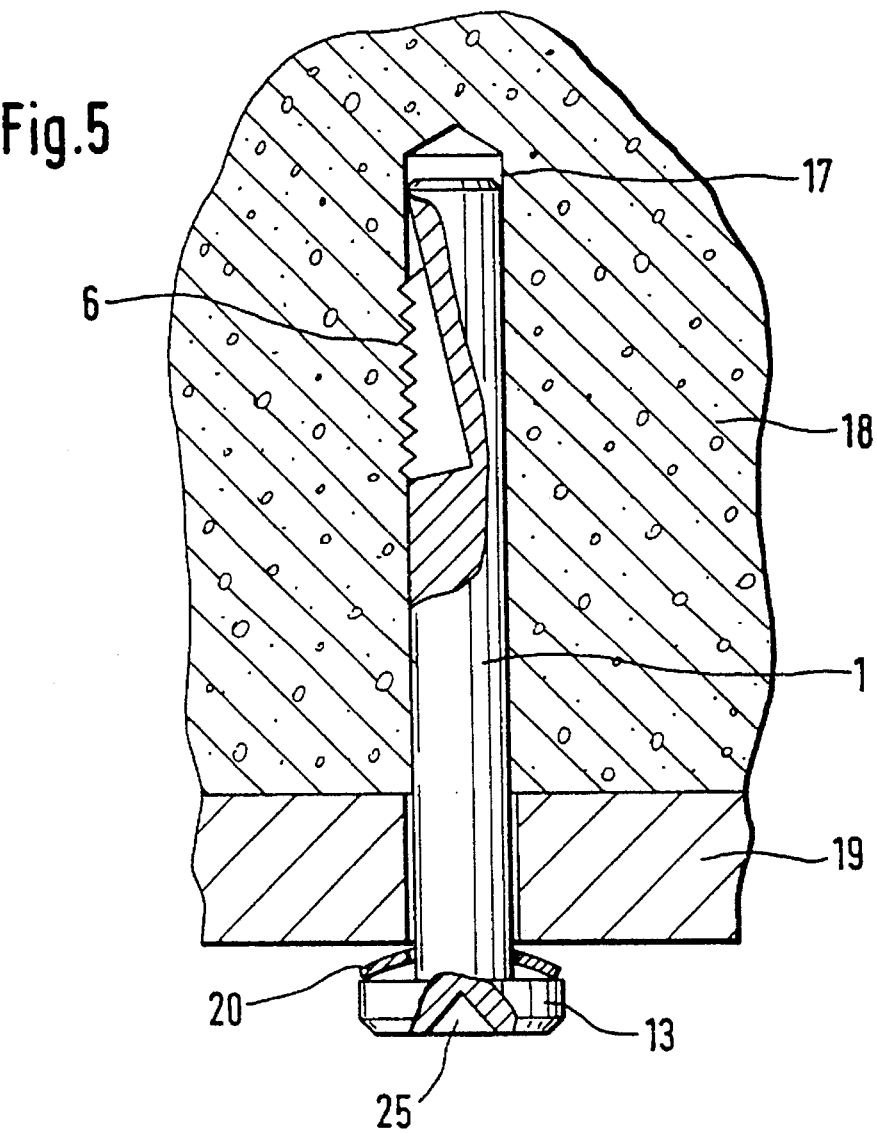
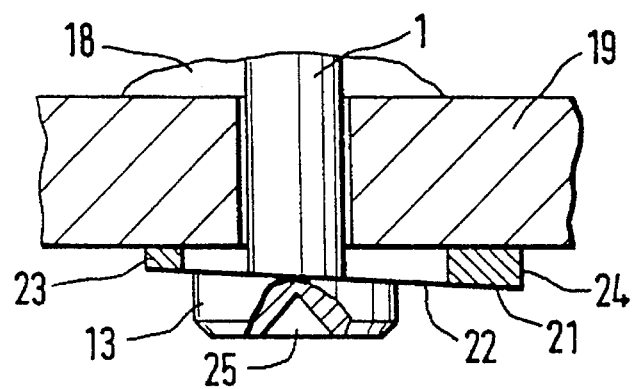

NAIL-LIKE FIXING ELEMENT WITH EXPANSION WEDGE

BACKGROUND OF THE INVENTION

The present invention relates generally to fixing elements.

More particularly, it relates to a fixing element which is provided with a retaining means for clamping an article to a component and has at least one expansion zone.

A fixing element which in the region of its leading end face has an expansion zone formed by two outwardly bowed arms extending spaced from one another is known from DE 33 45 331 A1. Such a fixing element is anchored by driving the shank of the fixing element into a hole pre-drilled in a component. As the shank is driven into the drilled hole, the expanding arms are pressed inwards and together by the wall of the drilled hole, and an expansion element inserted in the free space between the expanding arms increases the pressure of the expanding arms against the wall of the drilled hole. When the fixing element has been driven in, the expanding arms of the fixing element are pressed by the plastic and/or resilient restoring force of the expansion element against the wall of the drilled hole, with the result that a correspondingly high holding force is achieved. However, because of the full face-to-face contact of the insert, the driving-in resistance of the known fixing element is very high. Moreover, the known nail is not suitable for use in the tensile zone, in which the drilled hole may enlarge as a result of cracks forming. The insert is not able to compensate by subsequent expansion for enlargement of the drilled hole.

SUMMARY OF THE INVENTION

Accordingly, it is an object of the present invention to provide a fixing element of the above mentioned general type which avoids the disadvantages of the prior art.

More particularly it is an object of the present invention to provide a fixing element having an expansion zone, which on the one hand can be anchored in a simple manner merely by being driven into a component, and on the other hand as a result of subsequent expansion achieves high holding values even when the drilled hole enlarges as a result of cracks forming.

In keeping with these objects and with others which will become apparent hereinafter, one feature of the present invention resides, briefly stated, in a fixing element having retaining means arranged at its rear end for clamping an article to a component, and at least one expansion zone extending from the leading end face and in the longitudinal direction for part of the length of the shank of the fixing element, which expansion zone is formed by a free space with an expansion element inserted in the free space, wherein in accordance with the present invention the free space is in the form of a U-shaped longitudinal slot, the base of which slopes up towards the leading end face, and the expansion element is in the form of a wedge which is positioned in the longitudinal slot on the base so as to be displaceable toward the leading end face, the outer face of which wedge is provided with teeth which project beyond the shank.

A wedge inserted in a longitudinal slot in the shank of the fixing element is braced in the drilled hole with the wall thereof. If the drilled hole now enlarges as a result of cracks forming in the component, then the tensile load acting on the fixing element causes a displacement between the wedge braced immovably in the drilled hole and the shank of the fixing element. When this displacement occurs, the upwardly sloping base of the longitudinal slot produces an increase in the bracing action which fixedly anchors the fixing element in the component again despite enlargement of the drilled hole. This subsequent expansion effect thus renders a fixing element which can be anchored by being driven into a drilled hole also suitable for use in the tensile zone.

To reduce the resistance to driving in, it is useful for the toothed outer face of the wedge to be angled from the leading end face of the fixing element slightly to enlarge towards the rear end.

So that the wedge is immovably supported as the fixing element is being driven in, a stop member is provided at the limit of the longitudinal slot nearest the rear end of the fixing element, the stop member being in the form of an approximately right-angled termination against which the wedge bears at its deepest position.

Furthermore, a retaining element, preferably a rubber ring, can hold the wedge movably in the longitudinal slot before the fixing element is driven into the drilled dhole, so that the wedge does not accidentally fall out of the longitudinal slot.

A good locking action of the teeth combined with a low resistance to driving in is achieved as a result of the teeth having disparate tooth flanks, the shorter tooth flank being arranged facing towards the leading end face.

To ensure that the wedge is readily displaceable even under extreme conditions, it is useful to provide a sliding-contact layer between the bearing face of the wedge and the base of the longitudinal slot. This sliding-contact layer can be constituted by plastics material or created by suitable surface treatment of the base of the longitudinal slot and/or the bearing face of the wedge.

It is also advantageous, for extreme conditions, for a leaf spring which pressed the wedge radially outwards to be inserted between the base of the longitudinal slot and the wedge. If the drilled dhole enlarges significantly in relation to the diameter of the drilled dhole, the leaf spring presses the wedge against the wall of the drilled dhole so that the wedge is held by virtue of the increased friction and a displacement is able to occur between the wedge and the shank of the fixing element.

Finally, the fixing element can be provided at its leading end face with a nail tip. The fixing element can therefore be driven into soft and porous building materials, such as, for example, aerated concrete, without pre-drilling and can be anchored in these building materials with high holding forces.

The fixing element provided with a nail head is also suitable for anchoring in hard building materials. Such building materials require pre-drilling for the fixing element. Depending on the anchoring substrate and the drilling tool, the diameters of the drilled holes an be different. As the fixing element is driven in, although it is anchored by the self-locking action of the wedge, it is advantageous additionally to brace the article to be fixed against the surface of the masonry using a clamping element to avoid slippage as a result of different tolerances of the drilled holes. For that purpose, it is proposed to arrange beneath the nail head a clamping element which is either in the form of a cup spring or in the form of a wedge-shaped washer. If a cup spring is used, it exerts a bias force on the nail head which causes a slight axial displacement between the wedge and the fixing element. This displacement causes the fixing element to be wedged in the drilled hole, avoiding initial slippage.

The same effect is achieved with a wedge-shaped washer, which is driven in between the underside of the nail head forming a counter-wedge and the top surface of the article to be fixed.

In a further advantageous construction, the outer face of the wedge can be provided with a longitudinal recess bounded one each side by an outer edge; the bottom of the recess lies preferably within the diameter of the shank and only the outer edges provided with teeth project beyond the shank.

This construction further reduces the driving-in resistance without the holding force being diminished. As the fixing element is being driven in, the recess serves to accommodate the material scraped off the wall of the drilled hole. The reduction in the pressure-applying area of the expansion element by virtue of the recess causes the outer edges to dig more deeply into the wall of the drilled hole in the event of a displacement between the expansion element an the shank of the fixing element. Even the curved faces of the recess then come-into engagement with the wall of the drilled hole, causing a greater frictional resistance between the expansion element and the wall of the drilled hole on account of the larger surface area compared with a planar wedge element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 shows the fixing element, anchored in the drilled hole, with a cup spring as clamping element arranged beneath the nail head;

FIG. 6 shows the fixing element with a wedge-shaped washer as the clamping element;

DESCRIPTION OF THE PREFERRED EMBODIMENTS

Figure 1:
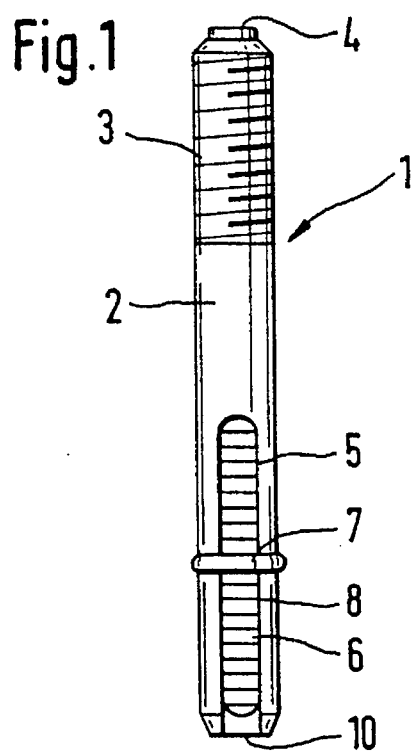
FIG. 1 shows the fixing element with a wedge lying in a longitudinal slot of its expansion zone.

The fixing element 1 in accordance with the invention illustrated in FIG. 1 has a shank 2 with an external thread 3 at its rear end 4 and an expansion zone which is formed by a longitudinal slot 5 of U-shaped cross-section with a wedge 6 inserted in this longitudinal slot. The wedge 6, which is readily displaceable in the longitudinal slot 5, is held by a retaining element 7, in this particular embodiment a rubber ring.

On the exposed to view upper edge, the wedge 6 has teeth 8 of saw-tooth configuration. The flanks 9 of the teeth (see FIG. 2) are inclined towards the leading end face 10 of the fixing element 1. The upper edge projects approximately by the height of the teeth beyond the shank 2. To reduce the resistance to driving in, the shank is angled from the leading end face 10 slightly to enlarge towards the rear end 4. Between the wedge 6 and the base 11 of the longitudinal slot 5 there is arranged a sliding-contact layer 12 in the form of a plastics material insert. This sliding-contact layer ensures displacement between the wedge 6 and the shank 2 of the fixing element even under extreme conditions. Favorable sliding behavior can also be achieved by suitable surface treatment of the bearing surface of the wedge 6 and/or of the base 11 of the longitudinal slot 5.

Figure 3:
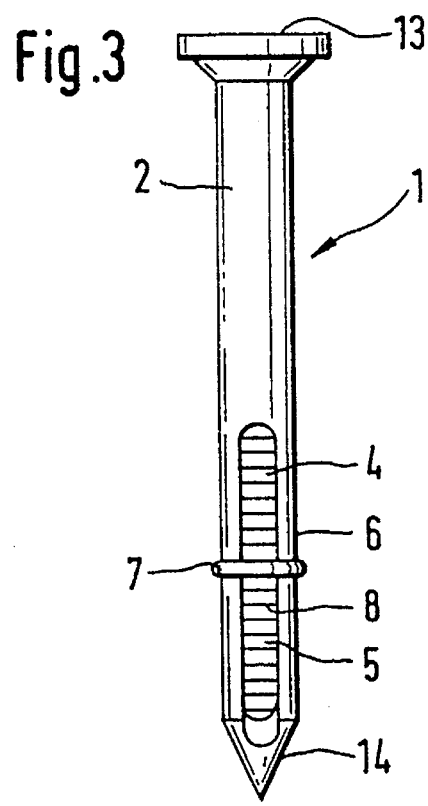
FIG. 3 shows the construction of the fixing element as a nail with a nail head and a nail tip.

In the embodiment illustrated in FIG. 3 the fixing element has a nail head 13 with a diameter exceeding the diameter of the shank and provided for clamping an article, and a substantially pointed nail tip 14 for driving the element into a soft and porous building material without pre-drilling.

Figure 4:
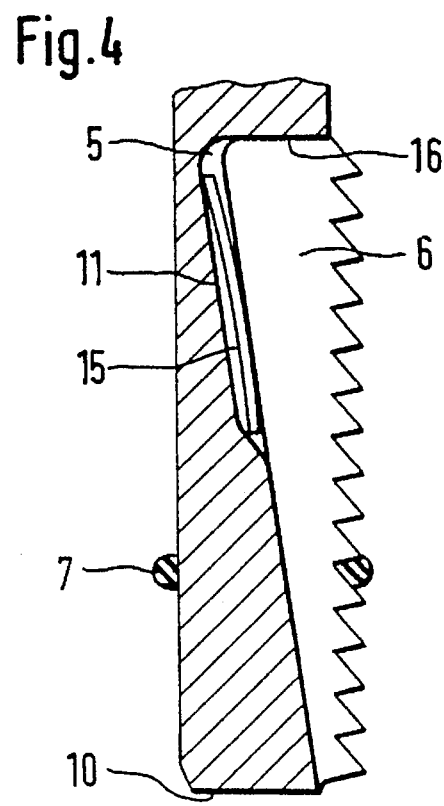
FIG. 4 is a longitudinal section of the fixing element with a leaf spring inserted in the longitudinal slot.

In the enlarged illustration of a longitudinal section through the expansion zone shown in FIG. 4, a leaf spring 15 can be seen inserted between the wedge 6 and the base 11 of the longitudinal slot 5. The wedge 6 lying on the leaf spring 15 is pressed by the spring against the wall of the drilled hole. Therefore when the drill hole enlarges as a result of cracks forming, the friction between the wedge 6 and the wall of the drilled hole is maintained.

Figure 2:
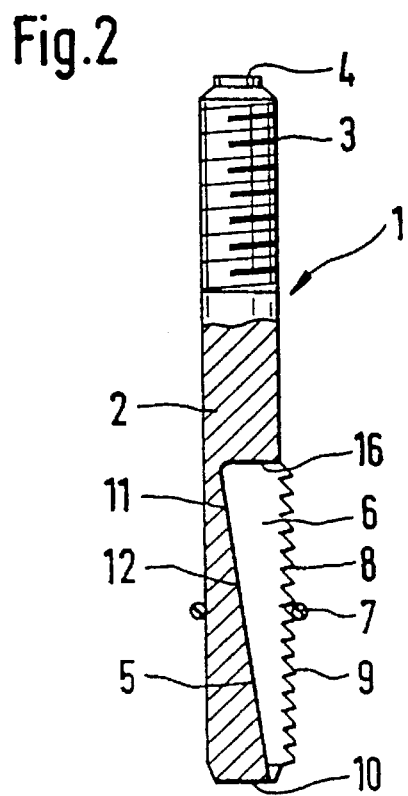
FIG. 2 is a longitudinal section of the fixing element of FIG. 1.

From the illustrations shown in FIGS. 2 and 4, it is clear that the base 11 of the longitudinal slot 5 slopes up towards the leading end face. The wedge 6 lying in the longitudinal slot 5 tapers correspondingly towards the leading end face 10, so that with the teeth 8 stamped out at its upper edge it projects beyond the shank 8, angled to enlarge slightly towards the rear end 4. At its end nearest the rear end 4, the longitudinal slot 5 has a stop member 16 against which the wedge 6 bears in its deepest position as the fixing element 1 is being driven in.

FIG. 5 shows the fixing element 1 anchored in a hole 17 drilled in a component 18; the fixing element is constructed with a nail head 13 for fixing the article 19. The clamping element in the form of a cup spring 20 is arranged beneath the nail head 13. As the fixing element 1 is driven in, the cup spring 20 is pressed flat, and generates a resilient bracing action between the nail head 13 and the article 19 to be fixed. This bracing action produces a bias force acting on the fixing element 1, and this force further wedge the expansion element, in the form of the wedge 6, with the fixing element 1 in the drilled dhole, through a slight axial displacement corresponding to the bias force of the cup spring 20.

In the embodiment of FIG. 5 a forcible bracing action is effected by the cup spring 20. In the embodiment of FIG. 6 however this bracing action is achieved by driving a wedge-shaped washer 21 beneath the nail head 13, which has a counter-wedge 22. The wedge faces ascending in opposite directions produce an axial displacement between the fixing element 1 and the expansion element 6 which causes the fixing element to be further wedged in the drilled hole 17 by means of the ascending base 11 of the longitudinal slot 5. Such a bracing action is always advantageous whenever the fixing element 1 has a nail head 13.

Figure 7:
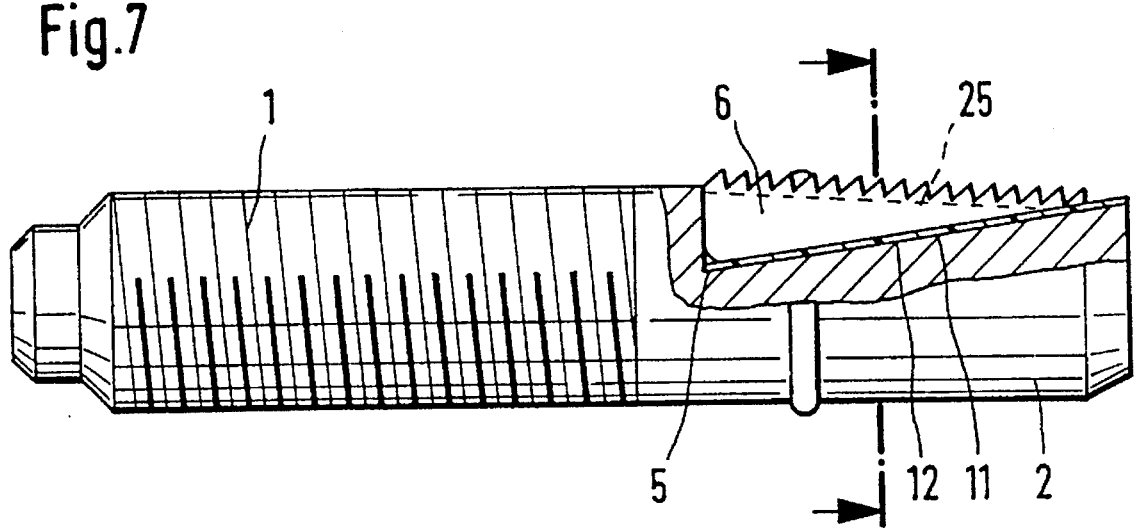
FIG. 7 is a variation of the fixing element in side view with an expansion element having a recess.
Figure 8:
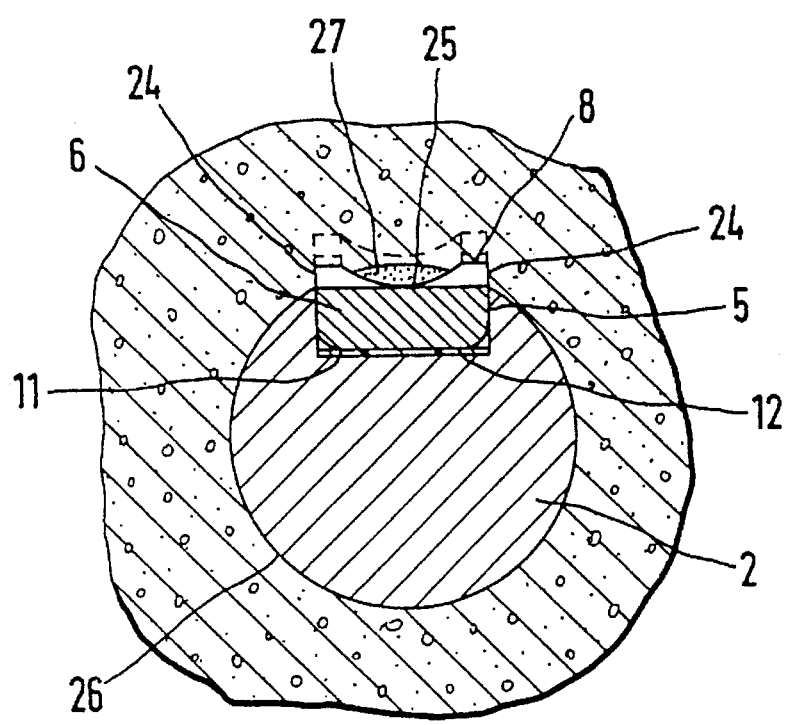
FIG. 8 is a cross-section of the fixing element of FIG. 7 along the section line A—A.

Moreover, a centering indentation 23 can be arranged in the nail head 13, which serves for driving out the nail head 13. Shown as 25 in FIGS. 5 and 6; 23 and 24 are parts, not described, of the washer 21. In FIGS. 7 and 8, 25 denotes the recess in the wedge and 24 denotes the side edges of that recess. It is thus possible to remove the article 19 from the component 18.

FIGS. 7 and 8 show a fixing element 1 in which the wedge 6 has a longitudinally extending recess 25 bounded on each side by an outer edge 24. The depth of the recess 25 is chosen to be such that the bottom of the recess lies within the diameter of the shank 2 and only the outer edges 24 provided with teeth 8 project beyond the shank 2. As the fixing element 1 is driven into a drilled hole 26 (see FIG. 8), a gap 27 appears between the bottom of the recess and the wall of the drilled dhole, and this gap serves to accommodate material scraped off during the driving-in operation. The position of the wedge 6 after axial displacement between the wedge 6 and the shank 2 is illustrated by a broken line. Because the base 11 of the longitudinal slot 5 slopes up towards the leading end of the fixing element, the wedge 6 is pressed outwards during the axial displacement so that the outer edges 24 dig more forcefully into the material. The gap 27 is also reduced or even completely eliminated thereby, so that the entire area of the recess is pressed into the wall of the drilled hole. To facilitate axial displacement, the wedge 6 rests on a Teflon insert forming the sliding-contact layer 12.

It will be understood that each of the elements described above, or two or more together, may also find a useful application in other types of constructions differing from the types described above.

While the invention has been illustrated and described as embodied in a fixing element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said teeth having disparate tooth flanks including shorter tooth flanks which are arranged facing toward said front end.

2. A nail-like fixing element as defined in claim 1, wherein said outer face of said wedge is angled from said front end slightly so as to exclusively enlarge to said rear end.

3. A nail-like fixing element as defined in claim 1; and further comprising a stop member arranged at a limit of said longitudinal slot nearest to said rear end, said wedge bearing against said stop member.

4. A nail-like fixing element as defined in claim 1; and further comprising a retaining element acting on said wedge and holding said wedge immovably in said longitudinal slot.

5. A nail-like fixing element as defined in claim 1; and further comprising a substantially pointed nail tip arranged at said front end of said shank.

6. A nail-like fixing element as defined in claim 1, wherein said retaining means is formed as a nail head; and further comprising a clamping element arranged beneath said nail head with a diameter exceeding a diameter of said shank, said wedge-shaped washer and said nail head having cooperating wedge faces.

7. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said longitudinal slot being provided with a sliding contact layer, said wedge lying on said sliding contact layer.

8. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank; and a leaf spring which presses said wedge radially outwardly and inserted between said base of said longitudinal slot and said wedge.

9. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said retaining means being formed as a nail head; and a clamping element arranged beneath said nail head, said clamping element being formed as a cup spring.

10. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said retaining means being formed as a nail head; and a clamping element arranged beneath said nail head, said clamping element being formed as a wedge-shaped washer, said shank having a nail head with a diameter exceeding a diameter of said shank, said wedge-shaped washer and said nail head having cooperating wedge faces.

11. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said wedge having an outer face provided with a longitudinal recess bounded on each side by an outer edge.

12. A nail-like fixing element as defined in claim 11, wherein said recess has a bottom which lies within a diameter of said shank, only said outer edges being provided with teeth projecting beyond said shank.

13. A nail-like fixing element, comprising a shank having a rear end and a front end; retaining means provided at said rear end of said shank for clamping an article to a component, said shank having at least one expansion zone extending from said front end in a longitudinal direction of a part of a length of said shank and being formed by a free space; an expansion element inserted in said free space, said space being formed as a U-shaped longitudinal slot with a base which slopes up toward said front end, said expansion element being formed as a wedge which is located in said longitudinal slot on said base so as to be displaceable towards said front end, said wedge having an outer face provided with teeth which project beyond said shank, said wedge having two end faces which are rounded.

* * * * *